Figure 1:
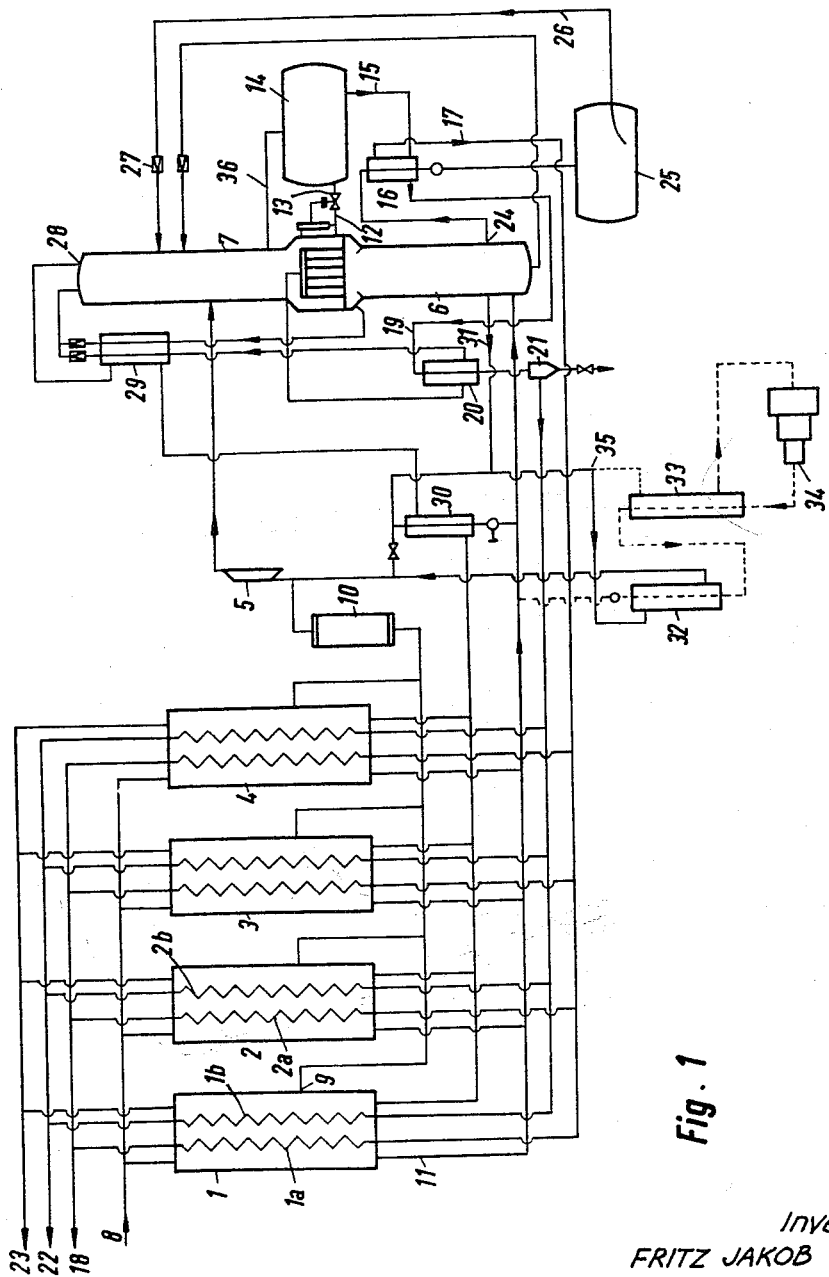

March 23, 1965

F. JAKOB ETAL 3,174,293

SYSTEM FOR PROVIDING GAS SEPARATION
PRODUCTS AT VARYING RATES

Filed Nov. 14, 1960

2 Sheets-Sheet 2

Inventors
FRITZ JAKOB
WALTER RUCKDESCHEL
MAX SEIDEL

By Toulmin & Toulmin
Attorneys

United States Patent Office 3,174,293
Patented Mar. 23, 1965

3,174,293
SYSTEM FOR PROVIDING GAS SEPARATION
PRODUCTS AT VARYING RATES
Fritz Jakob, Achmuhle, Walter Ruckdeschel, Pullach, and Max Seidel, Munich-Solln, Germany, assignors to Gesellschaft für Linde's Eismaschinen Aktiengesellschaft, Hollriegelskreuth, Germany
Filed Nov. 14, 1960, Ser. No. 69,229
4 Claims. (Cl. 62—39)

The present invention relates to a method and a system for the fractionation of gaseous mixtures. More in particular, the present invention relates to a method and a system for separating gaseous mixtures into fractions which are consumed at greatly varying rates.

The installations for the fractionation of gaseous mixtures such as, in particular, of air, as needed in industrial practice are subject to considerable variations in output due to the greatly varying amounts and rates of consumption of the separated products. For example, in the steel industry, oxygen is needed for the reduction of iron ore and for the refining of iron. The amount of oxygen needed at any particular time is, however, subject to considerable change. The normal recurring variations in oxygen consumption due to the nature of iron converters such as Bessemer converters can be balanced by storing a supply of gaseous oxygen under pressure. It frequently occurs, however, that a fractionation product such as oxygen or nitrogen is needed in excessively great amounts for a comparatively long period and in greatly reduced amounts under normal conditions. Due to the comparatively long duration of the respective period of normal and peak consumption a spare supply of pressure-stored oxygen is insufficient. In addition, the storage of the fractionation product in the gaseous phase is complicated and costly. As a consequence, the installation must be designed to meet the requirements of the period of peak consumption and results in a considerable capacity of the installation remaining unused during the period of normal consumption. It goes without saying that this is a waste of investment capital and costly equipment.

With the foregoing in mind it is an object of the present invention to provide a method and a system for the fractionation of gaseous mixtures into one or several products which makes it possible to balance the periods of peak consumption and normal consumption of the one or several products.

It is another object of the present invention to provide a method and a system of the mentioned type, enabling to design the installation so as to meet the medium consumption, thus making it unnecessary to design the installation with a view to maximum consumption.

It is a further object of the invention to provide a method and an installation of the mentioned type which results in a great saving of expensive equipment.

Other objects and advantages of the invention will become apparent as the description thereof proceeds.

The objects are achieved by the method and the system of the invention which is based on the Linde-Fränkel system with a balancing of variations in consumption of a fractionation product by means of evaporation of a stored, condensed gas. According to the method of the invention an amount of liquid stored decomposition product which had been produced and stored either initially at the start of the entire process, or, if the process is already under way, during a period of normal consumption, is evaporated as a supplementary supply. The refrigerating energy released by this evaporation is utilized for simultaneously liquefying the gaseous mixture to be fractionated, or another fractionation product, which is then stored in the liquid phase. During a following period of normal consumption, the thus stored liquid starting product is evaporated and/thus obtained refrigerating energy is used for liquefying a supplementary amount of the desired fractionation product, which is then stored for use during a period of peak consumption.

It will be apparent that, once an initial supplementary supply of the desired product has been prepared at the start of the entire process, the operation is an entirely continuous one, as the supplementary supply used up during a period of peak consumption is restocked during a period of normal consumption. At the same time, the refrigerating energies liberated when tapping the supplementary supply for consumption are largely preserved by liquefying a portion of a starting product or another separation product, thus storing refrigerating energy which is available when needed for restocking the supplementary supply of the desired product during a period of normal consumption. With the exception of inevitable energy losses the balancing or equalizing process is thus a self-sufficient one and very little energy has to be supplied to keep up the balancing operation.

The fractionation process proper is carried out according to known processes as, for example, the Linde-Fränkel process, the invention being confined to the aforementioned balancing operation. The energy losses are preferably compensated by work-performing expansion of a portion of the input gas stream.

According to the installation system of the invention, there is provided, associated with the conventional regenerators for fractionating and cooling the gases, a rectifying unit preferably comprising a high pressure column and a low pressure column. The rectifying unit communicates with a tank for storing the liquid fractionation product. Preferably, control means are provided for maintaining a constant level of liquid in the rectifying unit. A second tank is provided for storing the gaseous starting mixture in the liquid phase.

The first-mentioned tank communicates with an evaporating unit which is preferably disposed below the tank so that it can be filled completely even if the tank is almost empty, thereby eliminating the necessity of providing a separate pump. The evaporating unit is heated by the gaseous mixture to be fractionated and the evaporated fractionation product is conducted from the evaporating unit to the regenerators, or to cooling spiral systems in the regenerators. The evaporating unit can be connected with a supplementary evaporating unit in which there is evaporated constantly the amount of fractionation product needed as the basic output during a period of normal consumption.

The gaseous mixture to be fractionated condenses during the evaporation of the desired fractionation product and is collected in the aforementioned second tank which communicates with the low pressure column of the rectifying unit, so that the liquid stored therein can be used in the rectifying unit for cooling and liquefying a supplementary amount of the desired fractionation product during a period of normal consumption.

The gaseous mixture to be fractionated, for example air, is usually expanded in a work-performing expanding unit, for example a turbine, prior to being fed into the rectifying unit. According to the system and the method of the invention, however, there is a period of an excessive output during peak operation and during this period only comparatively little heat is available for the turbine. Since it is undesirable to expand up to and beyond the saturation point of the vapor, an advantageous modification of the invention provides an auxiliary preheating circuit for preheating the air prior to entering the turbine. The preheating circuit can be operated with thermoelectric switch elements. An alternative would be to make the entire fractionation process a discontinuous one and to pass a comparatively small amount of air through the turbine during normal operation and a greatly increased amount of air through the turbine during peak operation.

The basic embodiment of the system of the invention provides separate evaporating units externally of the rectifying unit. According to another, preferred embodiment of the invention, however, such separate evaporating units can be dispensed with and the evaporation of the respective liquids stored in the two tanks is effected within the rectifying unit proper.

According to an advantageous modification of the method of the invention susceptible for use with low pressure expanding machines forming the refrigerating unit, the amount of gaseous mixture, for example air, supplied for work-performing expansion is reduced during a period of peak consumption, thereby increasing the output of the desired product, for example oxygen, in the rectifying column by an increased amount of available washing liquid. During this period of increased oxygen consumption the necessary heat energy of the rectifying unit is supplied entirely or at least partly by the supplementary liquid oxygen from the storage tank and a greatly reduced amount of air or nitrogen in the liquid phase is supplied to the second storage tank, the latter supply being restocked during the period of normal consumption by increasing the amount of air or oxygen subject to work-performing expansion and tapping the rectifying column for an increased amount of liquid oxygen for storage in the first storage tank.

Figure 2:
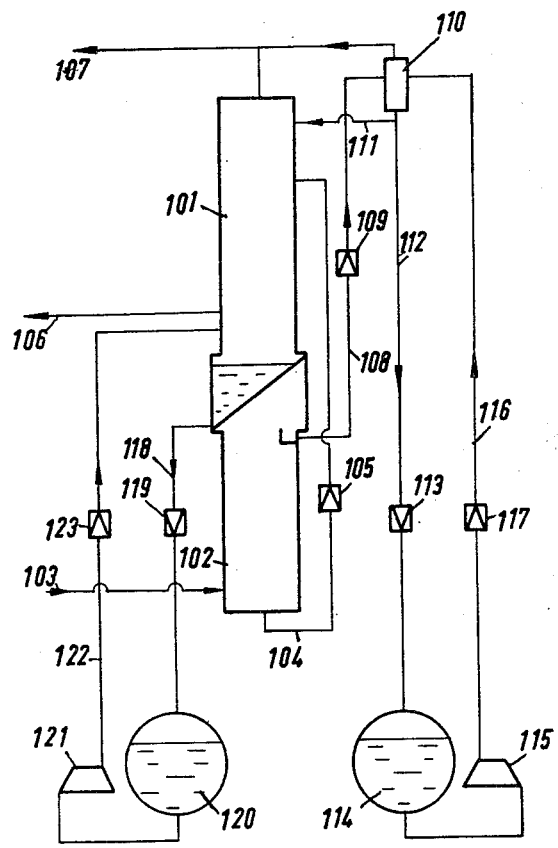

The invention will be further described with reference to the accompanying drawings, wherein FIGURE 1 is a schematic view of the system of the invention, wherein the fractionation product, for example oxygen, is evaporated externally of the rectifying column;

FIGURE 2 is a schematic view of the installation of the invention wherein the stored liquefied gases are evaporated within the rectifying column proper.

Referring now to the drawings somewhat more in detail and turning first to FIGURE 1, the installation is shown to have four regenerators 1, 2, 3, 4, having coiled tubes *a* and *b*. Coil *b* is used for the output of the basic supply of oxygen needed during normal operation whereas coil *a* supplies the additional amount required during the period of peak operation. 5 designates an expanding unit of gases such as, for example, a turbine, wherein a work-performing expansion of gases can be effected. The rectifying unit may consist, for example, of a two-column apparatus having a high pressure column 6 and a low-pressure column 7. The gaseous mixture to be fractionated, for example air, is fed to the installation via conduit 8, for example into regenerator 1. A portion of the air is tapped from the regenerator as at 9 and conducted through adsorber 10, whereupon it is expanded in turbine 5 and fed into low-pressure column 7 of the rectifying unit. The remaining portion of air flows through conduit 11 into the bottom of high-pressure column 6, wherein it is liquefied. The rectification is effected in a conventional manner not forming part of the invention and hence not described.

According to the invention there is provided a first storage tank for liquefied fractionation product, e.g. oxygen, designated with 14, and communicating with the foot of low-pressure column 7 via pipe conduit 12. Preferably, a control valve 13 which is either manually operable or automatic is provided in conduit 12 and controls the inflow so as to maintain a constant level of liquid within column 7. The oxygen evaporating in the storage tank 14 is returned into low-pressure column 7 via conduit 36.

An evaporating unit 16 is positioned somewhat below the storage tank 14 and communicates with the latter via conduit 15. The upper end of evaporating unit 16 is connected with coil *a* via conduit 17 and gaseous fractionation product, e.g. oxygen, flows through this conduit 17, coil *a*, and outlet pipe 18 to the consumer.

That portion of the fractionation product not evaporated in unit 16 is evaporated in a supplementary evaporator 20 communicating with unit 16 via pipe conduit 19, the latter evaporator being used during normal operation for evaporating a basic amount of the product then needed. The gaseous product flows into a separator 21 and from there into coil *b* and outlet pipe 22.

The necessary heat used for evaporation in unit 16 is produced by the condensation of the starting gaseous mixture, for example air, which is obtained from rectifying column 6 as at 24 and conducted through evaporating unit 16. The gaseous mixture, for example the air, is thus liquefied and collected and stored in a second storage tank 25. When needed during normal operation for restocking storage tank 14 with liquid oxygen, the liquefied air can be obtained from tank 25 through pipe conduit 26; it is expanded in valve 27 and supplied to rectifying column 7.

Another fractionation product, for example nitrogen, in the case of the fractionation of air, is obtained from rectifying column 7 at 28 which is conveyed through heat exchangers 29 and 30 and the regenerators, and leaves the installation through outlet pipe 23.

It will be noted that during the period of peak operation an excessive output of fractionation product, e.g oxygen, leaves the system and only comparatively little heat energy is available in turbine 5. Since it is highly undesirable to expand the vapor down to the vapor saturation point or even further, the system of the invention may provide an auxiliary pre-heating circuit operating at medium pressure which will next be described. A pipe conduit 31 is connected with high pressure column 6 on the one hand, and a heat exchanger 32, on the other hand. Gaseous mixture, for example air, is obtained from column 6 and conveyed through conduit 31 into heat exchanger 32, wherein it is preheated by means of air branched-off as at 35, which latter is heated in a heat exchanger 33 countercurrently with air compressed in a compressor 34. This branched-off air is then passed through heat exchanger 32 and added to the air flowing through pipe conduit 11 into rectifying column 6. The preheated portion of the air leaves heat exchanger 32 and flows into the turbine 5.

It will be appreciated that instead of storing in tank 25 gaseous mixture to be fractionated for example air, a product other than the most desired product, for example nitrogen, can be stored in tank 25. In the case of fractionation of air it is thus possible to store, for example, in the first tank 14 oxygen greatly needed during peak consumption and to store either air or nitrogen in the second tank 25.

Another embodiment of the invention is shown in FIGURE 2 which shows a rectifying unit consisting of a low-pressure column 101 and high pressure column 102. The gaseous mixture, for example air, to be fractionated, being at approximately the liquefaction temperature, is conveyed through pipe conduit 103 into high pressure column 102. The bottom of the latter column is connected with low-pressure column 101 via a pipe conduit 104 containing a throttle valve 105, and sump liquid rich in oxygen is conveyed through this conduit 105 from column 102 into low-pressure column 101. Gaseous oxygen is obtained through pipe conduit 106 and gaseous nitrogen through outlet pipe 107. Liquid nitrogen is conveyed through a conduit 108 and a throttle valve 109 through a separator 110 whose upper end is connected with pipe 107, while its lower end has a pipe conduit 111 through which a portion of the liquid nitrogen is supplied to the head of column 101 as a washing liquid. Through a pipe conduit 112 containing a valve 113, separator 110 is in communication with the storage tank 114 for storing liquid air or nitrogen therein. The bottom of this storage tank is connected with a pump 115 conveying the liquid through pipe conduit 116 and valve 117 into separator 110.

From the sump of column 110 liquid oxygen can be tapped which is then conveyed into a further storage tank 120 through pipe conduit 118 and valve 119. The bottom of storage tank 120 is connected with a pump 121 conveying the liquid oxygen through pipe conduit 122 and valve 123 into column 101.

During a period of peak consumption of gaseous oxygen received through conduit 106, liquid oxygen is pumped by pump 121 from storage tank 120 into column 101 where it is evaporated, while simultaneously there with liquid nitrogen is tapped through valve 113 and conveyed into and stored in tank 114.

During a period of normal operation, i.e. when a reduced amount of oxygen is needed, valve 113 is closed so as to stop conveyance of liquid nitrogen into tank 114, and pump 115 is operated to convey the stored liquid nitrogen into separator 110, and from the latter via pipe conduit 111 into low-pressure column 101, whereupon an excessive amount of oxygen is liquefied and stored in tank 120 for use during a period of increased consumption.

It will, of course, be appreciated that whenever the separation of air into oxygen and nitrogen has been referred to, this reference is merely by way of an example. Furthermore, whereas the system of this invention has been described as comprising regenerators, other heat exchanging apparatus such as reversible exchangers can be used.

It will be understood that this invention is susceptible to modification in order to adapt it to different usages and conditions and, accordingly, it is desired to comprehend such modifications within this invention as may fall within the scope of the appended claims.

What we claim is:

1. An apparatus for the separation of gaseous mixtures by low temperature rectification and for balancing the fluctuation in the consumption of the desired separation products due to recurring periods of peak and normal consumption, said apparatus comprising a two-column rectifying unit having a low pressure column and a high pressure column, a conduit means connected to the low pressure column and feeding expanded gaseous mixture thereto, means feeding compressed gaseous mixture to the high pressure column wherein it is liquified, a liquid separation product accumulating at the foot of the low pressure column, a storage tank for the separation product, a first vaporizer and a second vaporizer, means conducting the said separation product from the foot of the low pressure column through said storage tank, said first vaporizer and said second vaporizer in series fluid flow, means connecting the lower portion of said high pressure column to said first vaporizer to conduct a liquid fraction in heat exchange with said separation product and vaporizing a portion of the said separation product, means conducting the vaporized portion of separation product from said first vaporizer to a discharge outlet, means conducting a gaseous portion from said high pressure column in heat exchange with the second vaporizer to vaporize a second vapor portion of the said separation product, and means conducting the second vapor portion from said second vaporizer to a separate discharge outlet, said first vaporizer operating only during peak consumption of the separation product.

2. The invention as defined in claim 1, wherein the expanded gas is work expanded.

3. The invention as defined in claim 1, wherein the first and second vapor portions are passed in heat exchange with the gaseous mixture to cool the incoming gaseous mixture.

4. The invention as defined in claim 3, wherein the gaseous mixture is divided to provide the portion which is expanded and the portion which is introduced into the high pressure column.

References Cited by the Examiner

UNITED STATES PATENTS

| | | | |
|---|---|---|---|
| 1,951,184 | 3/34 | De Baufre | 62—19 |
| 1,951,185 | 3/34 | De Baufre | 62—19 |
| 2,113,680 | 4/38 | De Baufre | 62—19 |
| 2,321,445 | 6/43 | Yendall | 62—30 |
| 2,626,510 | 1/53 | Schilling | 62—14 |
| 2,655,796 | 10/53 | Rice | 62—14 |
| 2,708,831 | 5/55 | Wilkinson | 62—38 |
| 2,741,094 | 4/56 | Schuftan | 62—29 |
| 2,753,698 | 7/56 | Jakob | 62—38 |
| 2,788,646 | 4/57 | Rice | 62—14 |
| 2,825,212 | 3/58 | Linde | 62—38 |
| 2,850,880 | 9/58 | Jakob | 62—39 |
| 2,918,801 | 12/59 | First | 62—14 |
| 2,975,604 | 3/61 | McMahon | 62—52 |
| 3,056,268 | 10/62 | Grenier | 62—19 |
| 3,066,494 | 12/62 | Potts | 62—38 |

FOREIGN PATENTS

| | | |
|---|---|---|
| 1,158,639 | 1/58 | France. |
| 626,645 | 8/61 | Canada. |

NORMAN YUDKOFF, *Primary Examiner.*

GEORGE D. MITCHELL, ROBERT A. O'LEARY,
*Examiners.*